(12) United States Patent
Mao et al.

(10) Patent No.: US 10,725,472 B2
(45) Date of Patent: Jul. 28, 2020

(54) OBJECT TRACKING USING DEPTH INFORMATION

(71) Applicant: Beijing Airlango Technology Co., Ltd., Beijing (CN)

(72) Inventors: Yinian Mao, Beijing (CN); Xinmin Liu, Beijing (CN)

(73) Assignee: Beijing Airlango Technology Co., Ltd., Beijing (CN)

( * ) Notice: Subject to any disclaimer, the term of this patent is extended or adjusted under 35 U.S.C. 154(b) by 0 days.

(21) Appl. No.: 15/579,986

(22) PCT Filed: Aug. 10, 2017

(86) PCT No.: PCT/CN2017/096886
§ 371 (c)(1),
(2) Date: Dec. 6, 2017

(87) PCT Pub. No.: WO2019/028761
PCT Pub. Date: Feb. 14, 2019

(65) Prior Publication Data
US 2020/0159222 A1    May 21, 2020

(51) Int. Cl.
*G05D 1/00* (2006.01)
*G06T 11/20* (2006.01)
*G06T 7/593* (2017.01)
*G05D 1/10* (2006.01)
*G06T 5/40* (2006.01)
*G06T 7/246* (2017.01)

(52) U.S. Cl.
CPC .......... *G05D 1/0094* (2013.01); *G05D 1/101* (2013.01); *G06T 5/40* (2013.01); *G06T 7/248* (2017.01); *G06T 7/593* (2017.01); *G06T 11/20* (2013.01); *G06T 2207/10028* (2013.01); *G06T 2207/20084* (2013.01); *G06T 2210/12* (2013.01)

(58) Field of Classification Search
USPC ......................................................... 701/28
See application file for complete search history.

(56) References Cited

U.S. PATENT DOCUMENTS

| | | | |
|---|---|---|---|
| 2010/0195868 A1* | 8/2010 | Lu | G06T 7/70 382/103 |
| 2016/0019458 A1* | 1/2016 | Kaufhold | G01S 7/417 342/25 F |
| 2016/0304198 A1* | 10/2016 | Jourdan | G05D 1/042 |
| 2017/0293301 A1* | 10/2017 | Myslinski | G06Q 50/01 |

(Continued)

*Primary Examiner* — Tyler D Paige
(74) *Attorney, Agent, or Firm* — IPro, PLLC

(57) ABSTRACT

A technology for tracking a target object using depth information is disclosed. An object image contain a target object can be obtained from a reference image. A target distance from a robot to the target object can also be derived or accessed. When the robot captures a new image, 2D matching can be performed to find the horizontal and vertical movement of the target object. Distance change or depth change of the target object can also be calculated from the new image. A depth change ratio can be calculated and be utilized to scale a bounding box. The robot can then move to a new location according to the horizontal, vertical and depth changes. A new object image can be extracted from the new image according to the scaled bounding box. The object tracking can be continued using a similar process when the next image is captured.

20 Claims, 7 Drawing Sheets

(56) References Cited

U.S. PATENT DOCUMENTS

2018/0182109 A1\* 6/2018 Sun .................... G06T 7/246
2019/0250601 A1\* 8/2019 Donahoe ............... G05D 1/101
2019/0258277 A1\* 8/2019 Qian .................... B64C 39/024
2019/0377345 A1\* 12/2019 Bachrach ............. G06K 9/0063
2020/0073385 A1\* 3/2020 Jobanputra ........... G06F 9/547

\* cited by examiner

OBJECT TRACKING USING DEPTH INFORMATION

BACKGROUND

One of the functionality of robots, such as drones, is to track an object and follow the object. For example, a robot can be configured to identify an object, such as a human, and follow the object to wherever the object goes. This would require the robot to be able to track the object accurately and efficiently.

Tracking methods such as Trackers based on Kernelized correlation Filter ("KCF") have been proposed to track the object. However, these methods involve high computational complexity and are not suitable for robots because of the limited resources of the robots. More importantly, the tracking accuracy of these methods significantly reduces as the object moves for as short as just a few seconds. As such, these methods are not suitable for tracking objects in applications where the robot is required to follow an object for an extended period of time.

The disclosure made herein is presented with respect to these and other considerations.

SUMMARY

Technologies are described herein for tracking a target object using depth information. A robot can capture a first image showing a target object. Object data of the target object can be obtained or otherwise determined by the robot. The object data can include an object image that comprises a portion of the first image showing at least a portion of the target object, and a feature template of the object image. The feature template of the object image can be calculated and stored at the robot. The object data can further include position information including a target distance between the target object and the robot. The robot can be configured to move along with the target object when the target object moves, and to keep the distance between the robot and the target object to be close to the target distance.

The robot can be further configured to capture a second image showing the target object. A two-dimensional matching ("2D matching") can be performed by searching in the second image for a best match of the object image. The search can be performed by comparing the object image with multiple test object images obtained by extracting content contained in a search window applied onto the second image. The search window can have the same size as the object image and can be applied at different location of the second image. The match can be measured using the feature template of the object image and a feature vector calculated from each of the test object images. The test object image having the best match with the object image can be determined to be the matched test object image. By comparing the location of the object image in the first image and the location of the matched test object image in the second image, horizontal and vertical movement of the target object can be determined.

The robot can be configured to further determine its current distance to the target object when the second image is taken. The distance can be determined by using images taken by the camera or other distance or depth determination mechanisms equipped with the robot. A depth change ratio can then be calculated based on the distance between the robot and the target object when the first image was taken and the determined current distance. The depth change ratio can be utilized to improve the tracking accuracy. Specifically, a bounding box can be generated by scaling the search window that identifies the matched test object image in the second image according to the depth change ratio. An updated object image can be generated by extracting the content of the second image that are located inside the scaled bounding box. Based on the updated object image, the feature template can also be updated. The robot can move according to the calculated horizontal and vertical movement as well as the distance/depth change of the target object. If further tracking is to be performed, a new image can be taken and the above procedure can be repeated using the updated object image and feature template.

By utilizing the techniques described herein, the robot can maintain a relative position with the target object even if the target object moves around for an extended period of time. The techniques described herein improves the tracking accuracy by utilizing the depth information of the target object. It also significantly reduces the computational complexity of the object tracking by eliminating multiple searches along the depth dimension. For robotic devices, such as drones, that have limited resources, the reduction of the computational resources reduces the technical requirements of the robot, such as CPU, memory, and battery requirements, thereby reducing the cost of the robot. Other technical effects not specifically identified herein can also be realized through an implementation of the disclosed technologies.

It should be appreciated that the above-described subject matter can also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
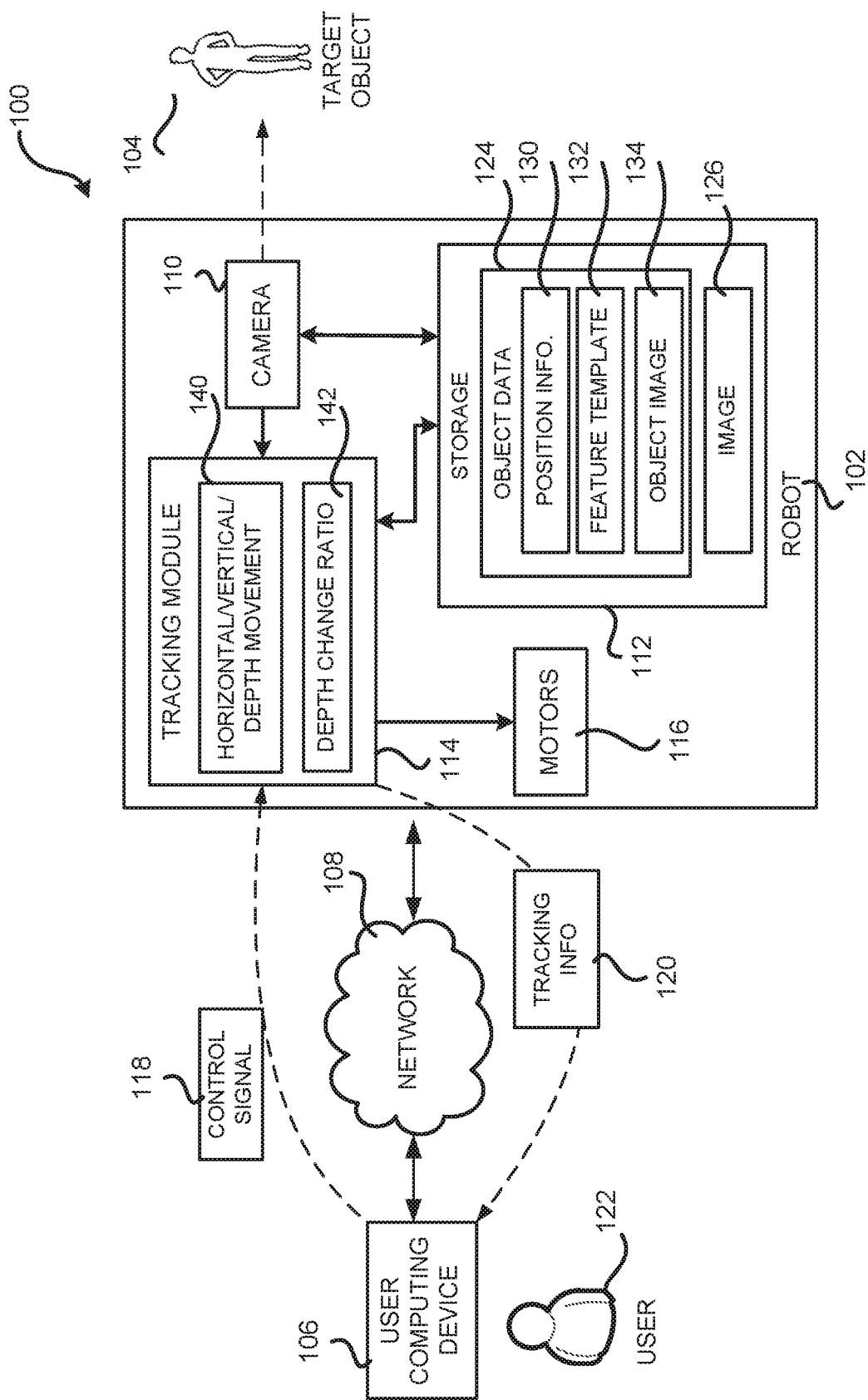
FIG. 1 is a system architecture diagram showing aspects of an illustrative operating environment for the technologies disclosed herein for tracking a target object using depth information, according to one configuration disclosed herein.

The following detailed description is directed to technologies for tracking a target object using depth information. Two images that showing the target object can be captured at different points of time. The image that is taken first can be utilized as a "reference image" for the tracking, such as to identify and extract object image, to measure relative movement of the target object, and so on. As used herein, the object image refers to a portion of the reference image that contains at least a portion of the target object. The object image can be obtained by applying a bounding box on the reference image and extracting the content of the reference image located inside the bounding box. In other words, the bounding box identifies the region of interest of the image, that is, the target object.

The image taken at a later time, referred to as a "working image," can reflect the new location of the target object. The movement of the target object can then be measured by comparing the object image and the working image. Since the target object might be moving in a three-dimensional space, the movement can be measured in terms of horizontal, vertical and depth movement. In one configuration, determination of the horizontal and vertical movement can be performed by a two-dimensional matching ("2D matching") based on the working image. The depth movement can be determined using the depth information of the target object, or the distance from the target object to the robot. In the following, "distance" and "depth" are used interchangeably, and both can be used to measure how far the target object is to the robot.

The 2D matching can be performed by extracting multiple test object images from the working image by applying a search window with a size of the object image at various locations of the working image. For each of the test object images, a similarity between the object image and the test object image can be calculated. The test object image having the highest similarity with the object image can be identified as the matched test object image and its location in the working image can be recorded. The horizontal and vertical movement of the target object can be determined by comparing the location of the object image in the reference image and the location of the matched test object image in the working image.

The depth movement or the depth change of the target object can be calculated by comparing a current distance between the target object and the robot when the working image was taken with the target distance. The current distance can be determined using images taken by the camera of the robot or other distance or depth determination mechanisms equipped with the robot. The difference between the current distance and the target distance can determine the movement of the target object along the depth dimension. The robot can move according to the determined horizontal, vertical and depth movement in order to maintain a desired relative position with respect to the target object.

The depth information can also be utilized to update the object image to improve the object tracking accuracy. In one configuration, a depth change ratio can be calculated based on the current distance of the target object to the robot and a previous distance between the target object and the robot when the reference image was taken. At the beginning of the tracking, the previous distance is the target distance. The depth change ratio can be utilized to scale a bounding box or a search window that identifies the matched test object image in the working image. An updated object image can then be extracted from within the scaled bounding box applied onto the working image. The current working image can then be utilized as the reference image and a new image taken at a later time can then be utilized as the working image for further object tracking. Additional details regarding the various aspects described briefly above will be provided below with regard to FIGS. 1-7.

While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like.

In the following detailed description, references are made to the accompanying drawings that form a part hereof, and which are shown by way of illustration, specific aspects or examples. Referring now to the drawings, in which like numerals represent like elements throughout the several figures, aspects of a computing system and methodology for subscribing, receiving and processing events will be described.

Turning now to FIG. 1, details will be provided regarding an illustrative operating environment 100 for the technologies disclosed herein for object tracking based on depth information. As shown in FIG. 1, a robot 102 can be configured to track a target object 104. The target object 104 can be any real-world objects, such as a pedestrian, a vehicle, or an animal. The robot 102 can be a machine capable of carrying out a series of actions autonomously. In one example, the robot 102 can be an unmanned aerial vehicle ("UAV"), also referred to as a drone. The UAV is an aircraft without a human pilot aboard. The flight of UAVs may operate with various degrees of autonomy: either under remote control by a human operator, or fully or intermittently autonomously. The robot 102 can include one or more motors 116 configured to move the robot along various directions. By way of example, and not limitation, the movement of the robot 102 can include back and forth, left and right, up and down, and rotation along an axis in the three-dimensional space.

In order to follow or track the target object 104, the robot 102 can be equipped with a camera 110. The camera 110 is an optical instrument for recording or capturing images 126 of the target object 104. The images 126 may be individual still photographs or sequences of images constituting videos or movies. The camera 110 can also be configured to provide the depth information of the images 126 it captures or enable the depth information to be derived. For example, the camera 110 can be a stereo camera with two or more lenses with a separate image sensor for each lens. In other examples, the camera 110 can be a depth camera such as a ranging camera, a flash LiDar, a time-of-flight ("ToF") camera, or a RGB-D camera.

The captured images 126 can be stored in a storage device 112 of the robot 102. A tracking module 114 of the robot 102 can utilize the images 126 to track the target object 104. Specifically, the tracking module 114 can obtain an image 126 as a reference image. An instance of the target object 104 can be detected in the reference image. The detection can be performed utilizing any image-based object detection method known in the art, such as deformable parts model, or convolutional neural network. Alternatively, or additionally, an instance of the target object 104 can be identified in the reference image manually by a user through a user interface. Additional details regarding the detection of the target object 104 in the reference image are discussed below with regard to FIG. 4. In the following, the term "target object" might also be used to refer to an instance of the target object, and the meaning of this term would be clear from the context.

Once the target object 104 is detected in the reference image, a bounding box can be applied to the reference image to specify the region of interest, that is, the target object 104. Image content contained in the bounding box can be extracted to form an object image 134. The object image 134 can be utilized to find the target object 104 in images 126 that will be taken in the future. The object image 134 can be stored in the storage 112 as a part of object data 124 of the target object 104.

The object data 124 can also include other information that can be utilized to facilitate the tracking of the target object 104. For example, the object data 124 can also include a feature template 132. The feature template 132 can include multiple feature points obtained from the object image 134. The feature points can be calculated using methods such as the histogram of oriented gradients ("HOG"), kernel correlation filter ("KCF"), wavelet transform-based features such as Haar-wavelet features, features from accelerated segment test ("FAST"), binary robust independent elementary features ("BRIEF"), oriented FAST and rotated BRIEF ("ORB"), scale-invariant feature transform ("SIFT"), speed up robust features ("SURF"), and/or other feature detectors and descriptors. It should be understood that the feature template 132 can include any features that are capable of describing the object image 134.

In addition to the object image 134 and the feature template 132, the object data 124 can also include position information 130 of the target object 104 describing the desired or target position of the robot 102 relative to the target object 104. For example, the position information 130 can include a target distance between the robot 102 and the target object 104, a horizontal relative position between the robot 102 and the target object 104, a vertical relative position between the robot 102 and the target object 104, and an orientation the robot 102 faces relative to the target object 104. Additional details regarding the object data 124 are provided below with respect to FIGS. 2A and 2B.

During the tracking, the camera 110 can capture a new image 126 after the reference image was captured. This new image 126 can be used as a working image. The tracking module 114 can access the storage 112 to retrieve the working image and the object data 124. Based on the object data 124, the tracking module 114 can find the corresponding target object 104 in the working image. The position change of the target object 104 from the reference image to the working image can be utilized to estimate the movement of the target object 104. The robot 102 can then move according to such estimated movement so that it can maintain the desired relative position with the target object 104.

According to one configuration, a 2D matching can be performed to identify the amount of horizontal and vertical movement of the target object 104. Specifically, a search window that has the same size as the object image 134 can be applied onto the working image to identify a test object image out of the working image. In order to find the best match, multiple test object images can be identified out of the working image by moving the search window to various locations of the working image. For each of the test object images, a feature vector can be calculated using the same method for calculating the feature template 132. The similarity between a test object image and the object image 134 can be measured by the distance between the feature vector of the corresponding test object image and the feature template 132. The test object image having the highest similarity with the object image 134 can be identified as the matched test object image. By comparing the location of the object image in the reference image and the location of the matched test object image in the working image, the horizontal and vertical movement of the target object can be calculated. Additional details regarding the 2D matching are provided below with respect to FIG. 3A.

The depth change or the depth movement of the target object can be calculated by comparing a current distance between the target object 104 and the robot 102 with the target distance specified in the position information 130. The current distance can be determined using images taken by the camera or other distance or depth determination mechanisms equipped with the robot. The difference between the current distance and the target distance can determine the movement of the target object 104 along the depth dimension. Once the amount of horizontal, vertical and depth movement 140 of the target object 104 are determined, they can be utilized to drive the motors 116 to move the robot 102 to a new location so that a desired relative position with the target object 104 can be maintained.

The depth or distance information can also be utilized to update the object data 124 to improve the tracking accuracy. In one configuration, a depth change ratio 142 can be calculated based on the current distance between the target object 104 and the robot 102 and a previous distance between the target object and the robot when the reference image was taken. At the beginning of the tracking, the previous distance is the target distance. The depth change ratio 142 can be utilized to generate an updated bounding box by scaling the search window or the bounding box that identifies the matched test object image in the working image. An updated object image 134 can then be extracted from the working image according to the updated bounding box. The feature template 132 can also be recalculated for the updated object image 134. For a next round of tracking, the above process can be repeated by utilizing the working image as the reference image and utilizing a new image taken at a later time as the working image. Additional details regarding the depth change determination and depth change ratio are provided below with respect to FIGS. 3B, 5 and 6.

The robot 102 can be in communication with a user computing device 106 through a network 108. The user computing device 106 can be a PC, a desktop workstation, a laptop or tablet, a notebook, a personal digital assistant ("PDA"), an electronic book reader, a smartphone, a game console, a set-top box, a consumer electronics device, a wearable computing device, a server computer, or any other computing device capable of communicating with the robot 102 through the network 108. The network 108 may include one or more wireless networks, such as a Global System for Mobile Communications ("GSM") network, a Code Division Multiple Access ("CDMA") network, a Long Term Evolution ("LTE") network, or any other type of wireless network.

For example, a user 122 can utilize the user computing device 106 to send a control signal 118 to the robot 102, such as to specify the target object 104, to set up tracking parameters, to request the start of the object tracking or to request canceling of the object tracking. The robot 102 can also transmit tracking information 120 back to the user computing device 106. The tracking information 120 can include any information related to the tracking of the target object 104, which includes, but is not limited to, the images 126 showing the target object 104, the accuracy measure of the tracking, or any request for user assistance during the tracking. Additional details regarding the user interaction with the robot 102 are provided below with respect to FIGS. 4A-4D.

Figure 2B:
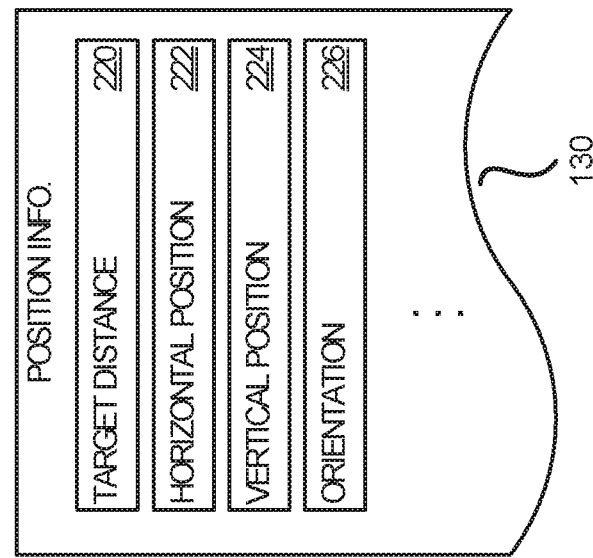
FIG. 2B is a data structure diagram illustrating a number of data elements contained in the position information of a target object, according to one configuration disclosed herein.
Figure 2A:
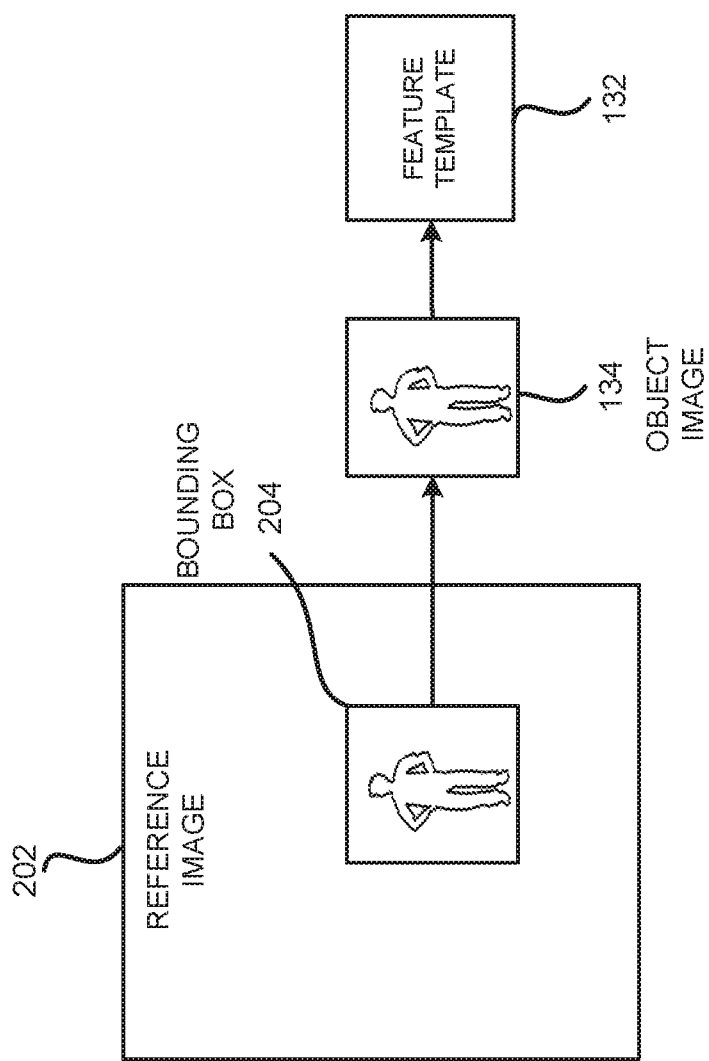
FIG. 2A is a block diagram showing aspects of an object image and a feature template for a target object, according to one configuration disclosed herein.

FIGS. 2A and 2B illustrate the object data 124 for the target object 104. Specifically, FIG. 2A is a block diagram showing aspects of an object image 134 and a feature template 132 for the target object 104, according to one configuration disclosed herein. As shown in FIG. 2A, the object image 134 can be extracted from a reference image 202 by applying a bounding box 204 on the reference image 202. The bounding box 204 identifies the target object 104 in the reference image 202. The object image 134 can be extracted to contain image content within the bounding box 204. The extracted object image 134 can then be processed to calculate the feature template 132. As briefly discussed above, in some implementations, the feature template 132 can include multiple feature points obtained from the object image 134. The feature points can be calculated using methods such as HOG, KCF, wavelet transform-based features such as Haar-wavelet features, and/or other feature detectors and descriptors such as FAST, ORB, SIFT, or SURF.

FIG. 2B is a data structure diagram illustrating a number of data elements contained in the position information 130 of a target object 104, according to one configuration disclosed herein. The position information 130 can describe the desired or target position of the robot 102 relative to the target object 104. For example, the position information 130 can include, but not limited to, a target distance 220 between the robot 102 and the target object 104, a horizontal relative position 222 between the robot 102 and the target object 104, a vertical relative position 222 between the robot 102 and the target object 104, and an orientation 226 in which the robot 102 faces relative to the target object 104.

It will be appreciated by one skilled in the art that the data structure shown in FIG. 2B can represent a database table, an object stored in a computer memory, a programmatic structure, or any other data container commonly known in the art. Each data element included in the data structure can represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

Figure 3A:
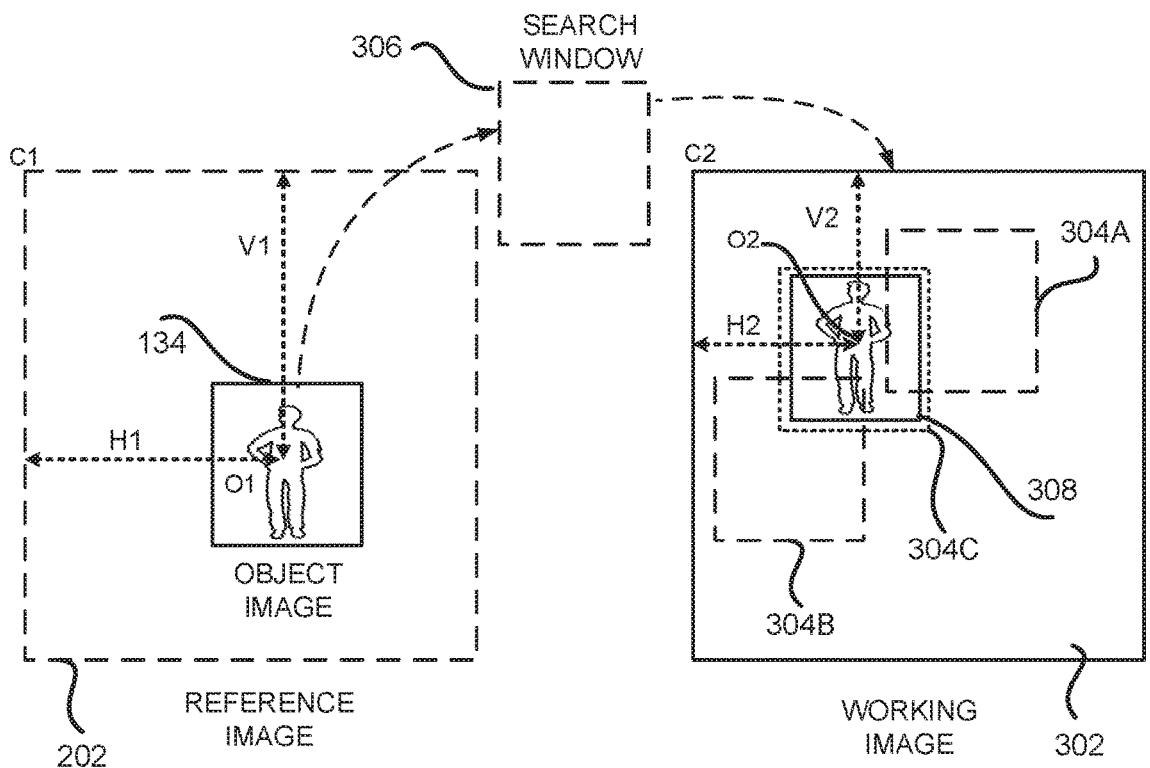
FIG. 3A is a diagram showing aspects of a 2D matching for determining horizontal and vertical movements of the target object, according to one particular configuration disclosed herein.

FIG. 3A is a diagram showing aspects of a 2D matching for determining horizontal and vertical movements 140 of the target object 104, according to one particular configuration disclosed herein. As briefly describe above, the 2D matching can be performed to identify the amount of horizontal and vertical movement of the target object 104. Specifically, a search window 306 that has the same size as the object image 134 can be applied onto the working image 302 to identify a test object image 304 out of the working image 302. In order to find the best match, multiple test object images 304A-304C can be identified in the working image 302 by moving the search window 306 to various locations of the working image 302. The test object images 304A-304C may be referred to herein individually as a test object image 304 or collectively as the test object images 304.

For each of the test object images 304, a feature vector can be calculated using the same method for calculating the feature template 132 as described above with respect to FIG. 2A. The similarity between a test object image 304 and the object image 134 can be measured by the distance between the feature vector of the test object image 304 and the feature template 132. For similarity comparison, methods such as normalized correlations, kernelized correlations, machine learning approaches such as support vector machine ("SVM"), adaptive boosting ("Adaboost") can be used. The test object image 304 having the highest similarity with the object image 134 can be identified as the matched test object image 304. In FIG. 3A, the test object image 304C represents the matched test object image.

By comparing the location of the object image 134 in the reference image 202 and the location of the matched test object image 304 in the working image 302, the horizontal and vertical movement 140 of the target object 104 can be calculated. As shown in FIG. 3A, H1 and V1 can be used to represent the horizontal and vertical location of the object image 134 in the reference image 202, respectively. H1 and V1 can be measured as the location of the center of the object image 134 O1 relative to the upper left corner C1 of the reference image 202. Similarly, H2 and V2 can be used to represent the horizontal and vertical location of the matched test object image 304C in the working image 302, respectively. H2 and V2 can be measured as the location of the center of the matched test object image 304C O2 relative to the upper left corner C2 of the working image 302. The difference between the horizontal location H1 and H2, i.e. H2-H1, can be used to measure the amount of the horizontal movement 140 of the target object 104. Likewise, the difference between the vertical locations V1 and V2, i.e. V2-V1, can be used to measure the amount of the vertical movement 140 of the target object 104. It should be understood that while H2-H1 and V2-V1 are measured in terms of image pixels, they can be converted to movement measured as an actual distance.

Figure 3B:
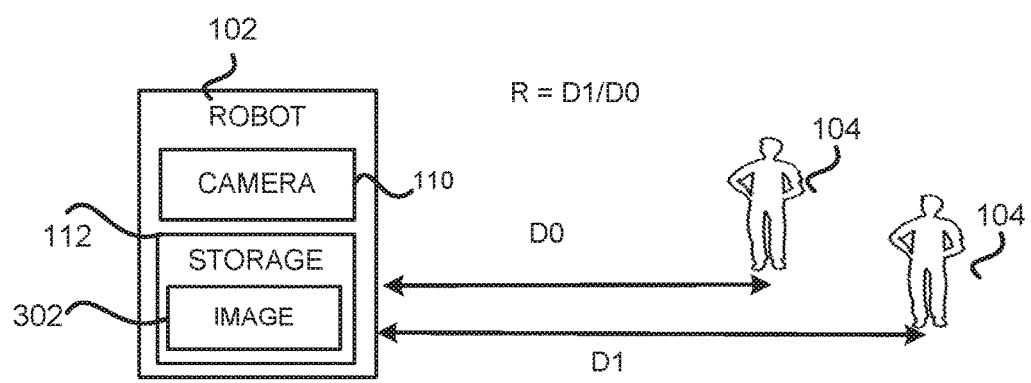
FIG. 3B is a diagram showing aspects of determining a depth change ratio for the target object, according to one particular configuration disclosed herein.

FIG. 3B is a diagram showing aspects of determining a depth change ratio 142 for the target object 104, according to one particular configuration disclosed herein. As shown in FIG. 3B, the depth change ratio 142, denoted by R, can be calculated as the ratio of the distance between the robot 102 and the target object 104 when the reference image 202 is taken, denoted as D0 over the distance between the robot 102 and the target object 104 when the working image 302 is taken, denoted as D1 and referred to as "current distance." That is, R=D0/D1. It should be noted that D0 can be the D1 in a previous round of calculation of the depth change ratio R. At the beginning of the tracking, D0 is the target distance 220.

In some implementations, the current distance D1 can be obtained based on the working image 302 and other images 126 captured at the same time. As discussed above, the camera 110 can be configured to provide depth information of the images 126 it captures or to enable the depth information to be derived. For example, if the camera 110 is a stereo camera, an image 126 captured by the camera 110 can include a left-view image and a right-view image wherein a disparity map of the image 126 can be derived from the right-view and left-view images. Each pixel of the disparity map represents a disparity value between the corresponding pixel on the left-view image and the right-view image. Parameters such as the distance between the lenses in the stereo camera can be utilized to convert the disparity value at a certain pixel of the disparity map to the actual distance between the camera 110 and the point on the target object 104 that corresponds to that particular pixel of the disparity map. In other words, the images 126 captured by the stereo camera 110 can be utilized to determine the distance between the camera 110 or the robot 102 to each point on the target object 104. It should be understood that depending on the type of the camera 110, the distance the robot 102 to each point on the target object 104 can be obtained through other mechanisms.

In order to estimate the current distance D1 efficiently and accurately, a predetermined number of depth sample points, denoted as N, can be selected from the matched test object image 304C. The corresponding N depth values can be calculated and a representative depth value can be derived from the set of N depth values as the D1. For example, the representative depth value can be the average value of the N depth values, or the median of the N depth values. In another implementation, a histogram of the set of N depth values can be computed to identify one or more clusters of depth values. The cluster having the highest number of depth values can be identified as a majority cluster. The representative depth value can be determined as a filtered value of the majority cluster by applying a filter on the depth values in the majority filter. Examples of the filter can include, but are not limited to, a median filter, a mean filter, a weight mean filter, or any other linear or non-linear filter. The value obtained after the filtering can be used as the estimated current distance D1. The depth change ratio 142 can then be calculated as D1/D0.

As discussed above, the depth change ratio 142 can be utilized to generate an updated bounding box by scaling the search window that identifies the matched test object image 304C in the working image 302. In the example shown in FIG. 3A, the updated bounding box can be generated by scaling the search window associated with the matched test object image 304C according to the depth change ratio 142. An updated object image 134 can then be extracted from the working image 302 based on the bounding box. In FIG. 3A, the bounding box 308 shows the updated bounding box, and the image content within the bounding box 308 can be utilized as the updated object image 134.

In an alternative implementation, the updated object image 134 can be obtained by maintaining the size of the search window associated with the matched test object image 304C but scaling the working image 302. Specifically, the working image 302 can be scaled according to the inverse of the depth change ratio 142, i.e. 1/R. The content of the scaled working image 302 that falls inside the search window can be extracted as the updated object image 134.

Once the updated object image 134 is generated, the feature template 132 can also be recalculated based on the updated object image 134. The working image 302, from which the updated object image 134 is extracted, can be utilized as the reference image 202 for the next round of tracking and a new image taken at a later time can be utilized as the working image 302. The mechanism described above can be repeated to perform the tracking of the target object 104.

Figure 4B:
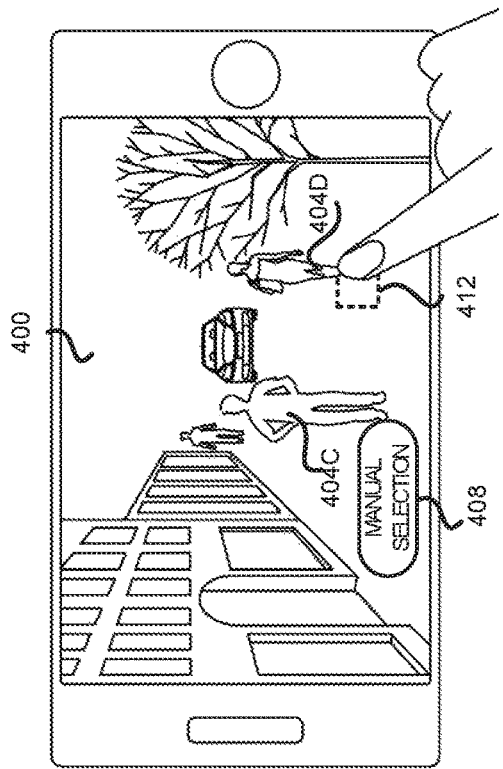
FIG. 4A-4D are diagrams showing illustrative user interfaces for controlling the tracking of a target object, according to one configuration disclosed herein.
Figure 4D:
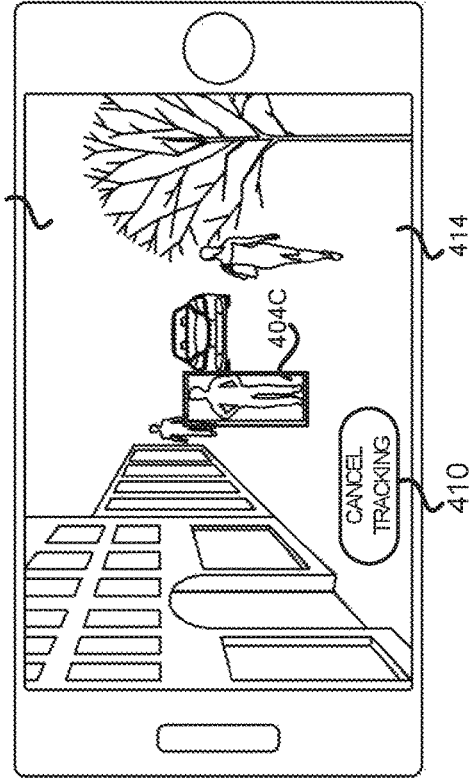
Figure 4A:
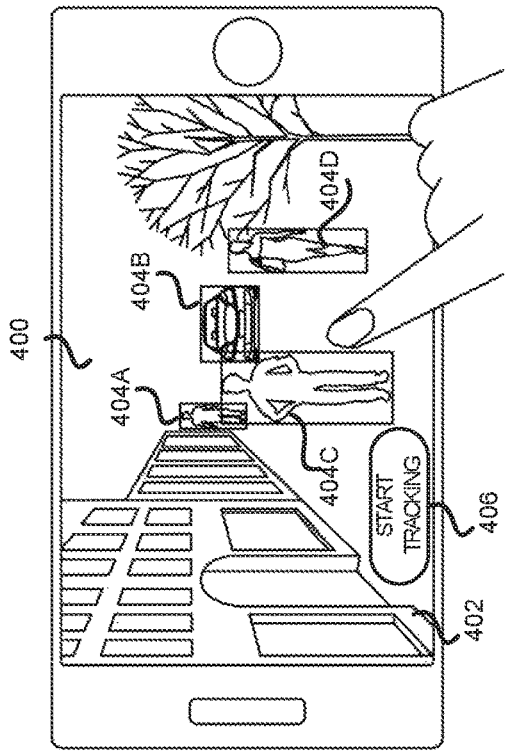

FIGS. 4A-4D are diagrams showing an illustrative user interface 400 configured to allow a user 122 to control the tracking of a target object 104, according to one configuration disclosed herein. In one implementation, the user interface 400 can be displayed on the user computing device 106 associated with a user 122. It should be understood that the user interface 400 can also be displayed on other device to other users. FIG. 4A shows the user interface 400 at the start of the tracking when the user 122 activates the tracking process. As shown in FIG. 4A, the user interface 400 shows an image 402 of a scene that includes one or more objects, such as humans, vehicles, buildings, etc. The image 402 and any other images or videos taken by the robot 102 can be transmitted from the robot 102 to the user computing device 106 through the network 108. The user interface 400 can also include a user interface control 406 that, when activated, can be configured to initiate the object tracking process based on the image 402 shown in user interface 400. Once the user 122 activates the user interfaces control 406, the tracking module 114 or another module of the robot 102, can start an automatic object detection process on the image 402 to identify potential objects in the image 402. The object detection can be performed using any method known in the art, such as such as deformable parts model, or convolutional neural network.

In the example shown in FIG. 4A, four objects are detected, 404A-404D and each of the detected objects is identified using a bounding box. The user 122 can select an object from the detected objects as the target object 104 by, for example, clicking on the object. Alternatively, or additionally, the target object 104 can be selected manually by the user 122 through, for example, drawing a bounding box around the target object 104 as illustrated by FIG. 4B. In the example shown in FIG. 4B, the user 122 can draw a bounding box 412 around the object 404D in order to make the object 404D as the target object 104. The user 122 can then activate a user interface control 408 configured to confirm the user's manual selection of the target object 104. It should be appreciated that various other mechanisms can be provided to enable the user 122 to manually select the target object 104.

Figure 4C:
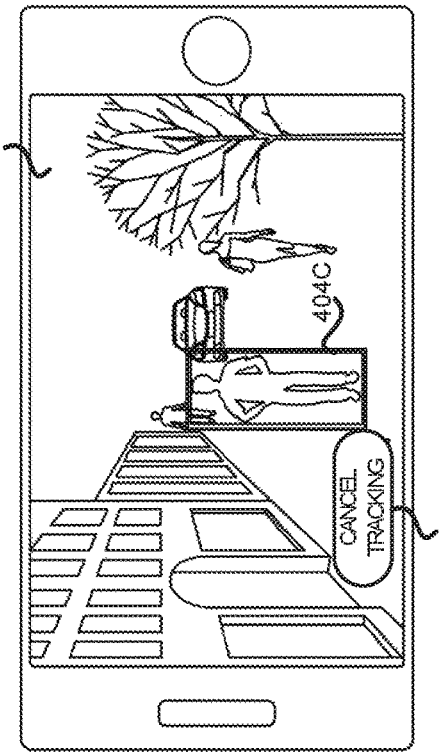

Once the target object 104 is selected, the bounding box around other automatically detected objects, if there are any, can be removed or made less visible. The bounding box of the selected target object 104, on the other hand, can be made more salient, such as by changing its color, changing its line pattern, changing its line width, and the like. FIG. 4C illustrates the user interface 400 after the target object 404C is selected. As shown in the figure, the selected target object 404C is identified using a bounding box having a double line border. The tracking of the object 404C as described above can then start immediately.

At the beginning of the tracking, the image 402 can serve as the reference image 202, the bounding box around the selected target object 404C can be utilized to extract the object image 134. Feature template 132 can then be calculated based on the extracted object image 134. The relative position between the robot 102 and the selected target object 104 can be recorded as the position information 130. An image taken by the robot 102 after the image 402 was taken can be utilized as the working image 302 to perform the tracking of the target object 104 as described above. FIG. 4D shows the user interface 400 during the tracking. In the particular example shown in FIG. 4D, the target object 404C has moved to a new location, the image 402 shown in the user interface 400 is replaced with a new image 414 taken when the selected target object 404C moves to the new location. The new image 414 can be used as the working image 302 for the tracking purpose. At any point of time when the user 122 desires to cancel the tracking, he or she can activate the user interface control 410 to terminate the tracking process. Additional details regarding the object tracking are provided below with respect to FIGS. 5 and 6.

It should be noted that the user interface 400 shown in FIGS. 4A-4D is for illustration only, and should not be construed as limiting. Various other ways of displaying the images and controlling the tracking can be utilized. For example, the user interface controls 406, 408 and 410 can be simultaneously displayed in the user interface 400. Other user interface controls can also be displayed, such as a user interface control that allows the user 122 to configure the position information 130, and/or to change the position information 130 during the tracking. The user interface 400 can also be configured to display a warning message when the robot 102 loses the tracking of the target object 104. For example, this can be determined by comparing the similarity between the matched test object image and the object image 134 with a threshold value. If the similarity is below the threshold value, it can be determined that the robot 102 has lost the track of the target object 104. In that case, the user 122 can cancel the tracking or provide a certain form of assistance to the robot 102, such as manually identifying the target object 104 in the working image or issuing a command to move the robot 102 to a location where the tracking can be resumed. The information displayed in the user interface 400 can be sent by the robot 102 to the user computing device 106 as the tracking information 120. The command, request, or any other input of the user 122 can be sent from the 106 to the robot 102 as the control signal 118.

Figure 5:
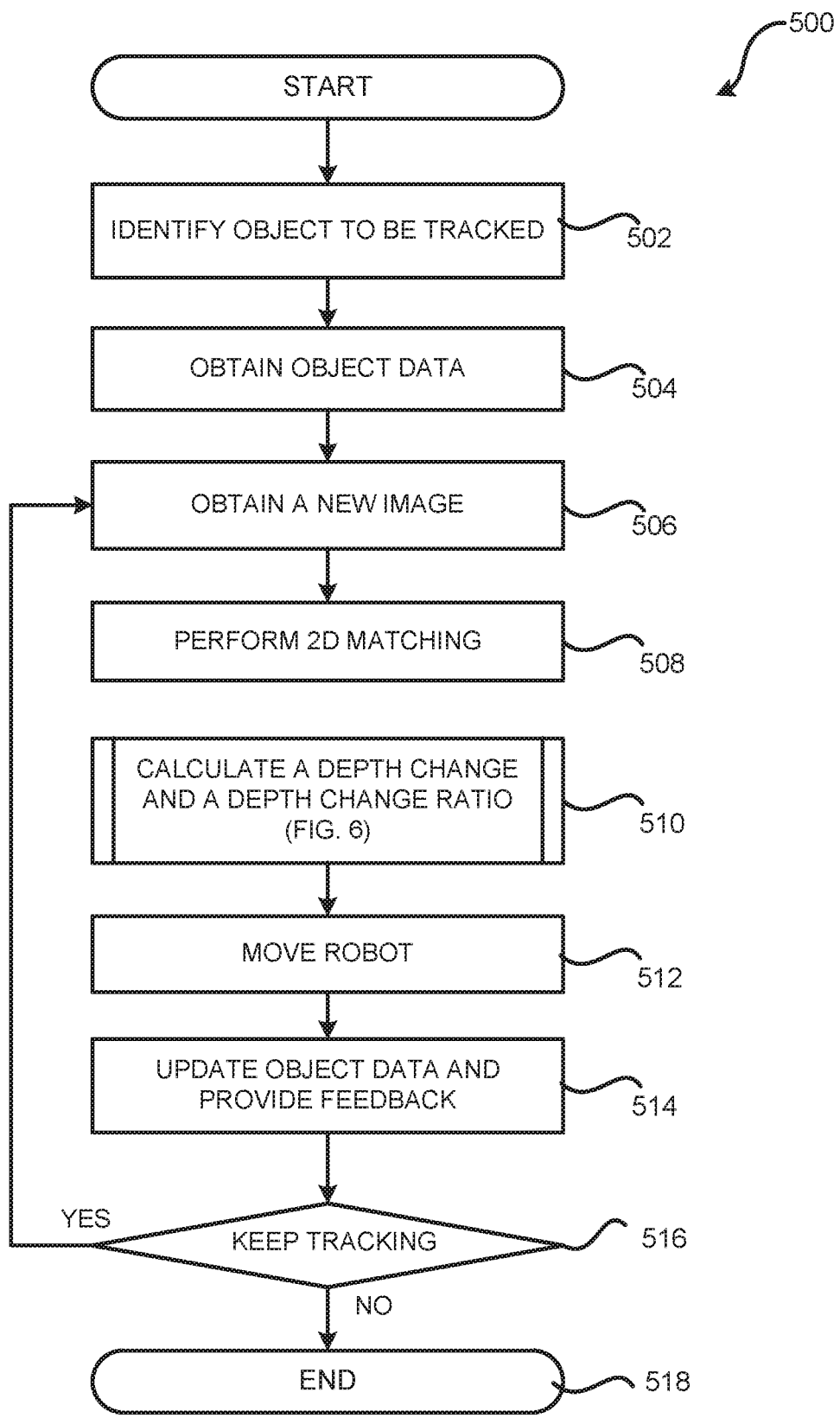
FIG. 5 is a flow diagram showing a routine that illustrates aspects of a method for tracking a target object using depth information, according to one configuration disclosed herein.

FIG. 5 is a flow diagram showing a routine 500 that illustrates aspects of a method for tracking a target object 104 using depth information, according to one configuration disclosed herein. Routine 500 can be performed by the tracking module 114 or any other module of the robot 102. It should be appreciated that the logical operations described herein with respect to FIG. 5, and the other FIGURES, can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGURES. and described herein. These operations can also be performed in parallel, or in a different order than those described herein. Some or all of these operations can also be performed by components other than those specifically identified.

The routine 500 begins at operation 502, where the robot 102 can identify the target object 104 to be tracked. As discussed above, the identification can be performed by receiving a selection from among several automatically detected objects or by receiving an indication of the target object 104 directly from the user 122, such as through the user 122 drawing a bounding box manually around the target object 104. Once the target object 104 is identified, the routine 500 proceeds to operation 504, where object data 124 can be obtained. The object image 134 can be extracted from the reference image 202, which can be the image from which the target object 104 is selected. The object image 134 can be extracted according to the bounding box around the target object 104. Once the object image 134 is obtained, the feature template 132 can be calculated based on the object image 134. As discussed above, the feature template 132 can include multiple feature points obtained from the object image 134. The feature points can be calculated using methods such as HOG, KCF, wavelet transform-based features such as Haar-wavelet features, and/or other feature detectors and descriptors such as FAST, ORB, SIFT, or SURF. The position information 130 of the object data 124 can be obtained by capturing the current relative position between the robot 102 and the target object 104. Alternatively, or additionally, the position information 130 can be obtained through user input, such as through the user interface 400.

From operation 504, the routine 500 proceeds to operation 506, where a new image 126 can be captured by the robot 102. The new image 126 can be utilized as the working image 302 in order to perform the object tracking. The routine 500 then proceeds to operation 508, where a 2D tracking can be performed for the target object 104. As described above, the 2D matching can be performed to identify the amount of horizontal and vertical movement of the target object 104. To perform the 2D matching, a search window 306 that has the same size as the object image 134 can be applied onto the working image 302 to identify a test object image 304 out of the working image 126. In order to find the best match, multiple test object images 304 can be identified out of the working image 302 by moving the search window 306 to various locations of the working image 302.

For each of the test object images 304, a feature vector can be calculated using the same method for calculating the feature template 132. The similarity between a test object image 304 and the object image 134 can be measured by the distance between the feature vector of the corresponding test object image 304 and the feature template 132. The test object image 304 having the highest similarity with the object image 134 can be identified as the matched test object image 304. By comparing the location of the object image 134 in the reference image 202 and the location of the matched test object image 304 in the working image 302, the horizontal and vertical movement of the target object 104 can be calculated.

From operation 508, the routine 500 proceeds to operation 510, where the depth or distance of the target object 104 relative to the robot 102 when the working image 302 was taken can be calculated. Based on such a distance, a depth change of the target object 104 and a depth change ratio 142 can be computed. The depth change ratio 142 can be utilized to update the object data 124 and to prepare the robot 102 for the tracking in next round. Additional details regarding the calculation of the depth change ratio 142 will be provided below with regard to FIG. 6.

The routine 500 then proceeds to operation 512, where the robot 102 moves to a new location based on the calculated horizontal, vertical and depth change of the target object 104 so that the robot 102 can maintain a relative position specified in the position information 130 of the object data 124. For a UAV application, a precise change in its position in the 3-dimensional space can be achieved by first computing a position change vector, then executing a position control to cause the drone to move to the desired position, where the drone estimates its position based on readings from a multitude of sensors, including but not limited to, satellite-based positioning systems such as Global Navigation Satellite Systems ("GNSS"), optical flow based positioning system, visual inertial odometry, and microwave-based positioning systems such as ultra-wideband. For UAV applications, horizontal and vertical positions are combined with a change in the heading (yaw direction). As a UAV does not have to follow a specific path on the ground, the heading change can be prioritized over the horizontal movement, so as to keep the target object within the proximity of the center of field of view.

The routine 500 then proceeds from operation 512 to operation 514 where object data 124 is updated and tracking information 120 is sent to the user computing device 106. As discussed above, the depth change ratio 142 can be utilized to generate an updated bounding box by scaling the search window that identifies the matched test object image 304 in the working image 302. An updated object image 134 can then be extracted from the working image 302 according to the updated bounding box. The updated object image 134 can also be generated by maintaining the size of the searching window, but to scale the working image 302 based on the depth change ratio 142. The feature template 132 can also be recalculated for the updated object image 134. The working image 302 can be utilized as the reference image 202 for next round of tracking. Tracking information 120, such as the new image, the updated bounding box of the object image 134, the calculated horizontal, vertical and depth change of the target object 104, can be transmitted to the user computing device 106 to be presented to the user 122.

The routine 500 then proceeds from operation 516, where it is determined whether the tracking should be continued. For example, the determination can be based on whether the user 122 has activated the user interface control 410 to cancel the tracking. It can also be determined based on whether the robot 102 has lost track of the target object 104 as discussed above. If it is determined that the tracking should be continued, the routine 500 returns to operation 506, where a next image can be obtained and used as a working image for tracking. If it is determined at operation 516 that the tracking should be stopped, routine 500 proceeds to operation 518, where it ends.

Figure 6:
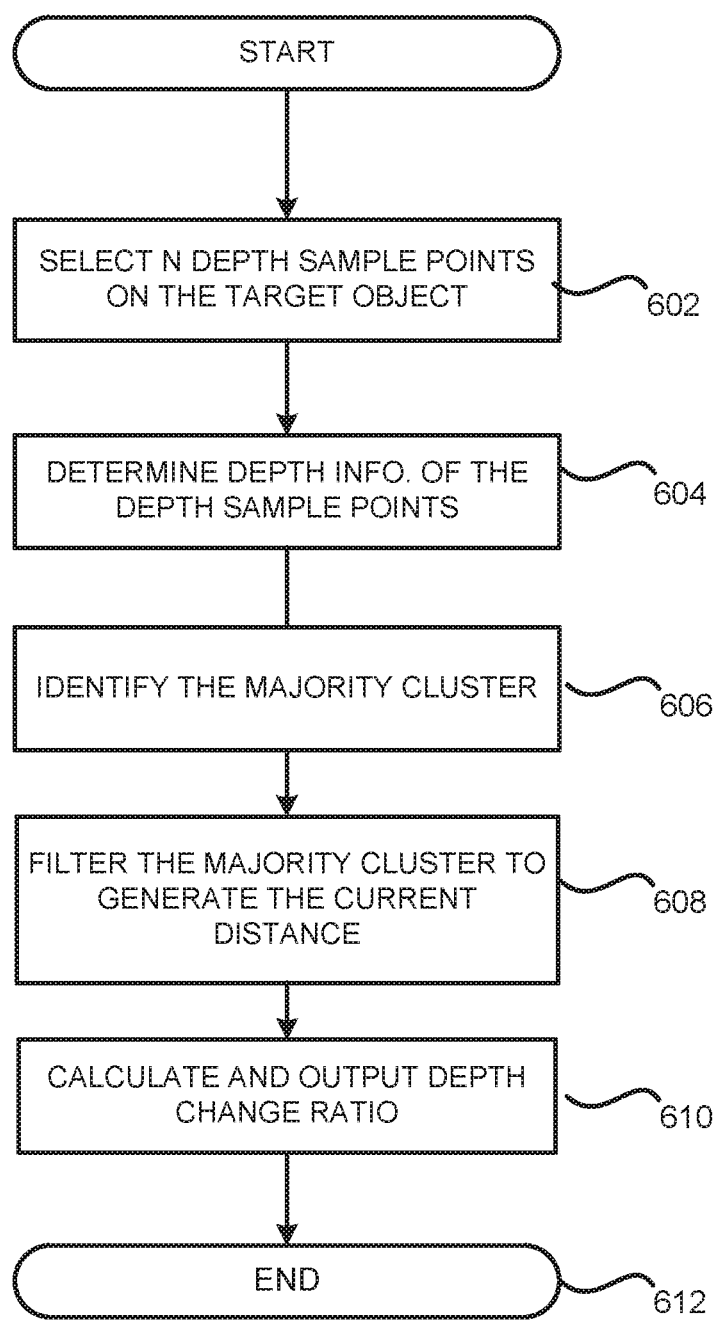
FIG. 6 is a flow diagram showing a routine that illustrates aspects of a method of determining a current distance of a target object and a depth change ratio of the target object, according to one configuration disclosed herein.

FIG. 6 is a flow diagram showing a routine 600 that illustrates aspects of a method for determining a depth change 140 and a depth change ratio 142 of a target object 104, according to one configuration disclosed herein. The routine 600 begins at operation 602, where N depth sample points are selected from the matched test object image 304 to estimate the depth of the target object 104 relative to the robot 102 when the working image 302 was taken. The number N can be predetermined, or randomly generated. The higher the number N is, the better the estimation is, but the higher the computational complexity is. For a 50-by-100 matched test object image 304, N can take the value of 200.

From operation 602, the routine 600 proceeds to operation 604, where the depth value for each of the N depth sample points is determined. As discussed above, depending on the type of the camera 110 that captured the working image 302, the depth value can be determined through different mechanisms. For example, if the camera 110 is a stereo camera, the depth value can be determined by calculating a disparity between the corresponding points in the left and right view of the image. If the camera 110 is a depth camera such as a ranging camera, a flash LiDar, a time-of-flight ("ToF") camera, or a RGB-D camera, the depth value can be directed measured and provided by the camera 110.

The routine 600 then proceeds to operation 606, where the N depth values are clustered and a majority cluster is identified. In one implementation, the clustering can be performed by computing a histogram of the N depth values. The depth range where most of the depth values are concentrated can be identified as the majority cluster. It should be noted that other clustering mechanisms can also be utilized to identify the majority cluster. It is intended that this application include all such mechanisms of clustering.

From operation 606, the routine 600 proceeds to operation 608 where the disparity values in the majority cluster are filtered to generated a filtered disparity value, which can be utilized to estimate the current distance D1 between the robot 102 and the target object 104 when the working image 302 was taken. The filter can be a median filter, a mean filter, a weight mean filter, or any other linear or non-linear filter. The routine 600 then proceeds to operation 610, where the current distance D1 can be compared with the target distance 220 contained in the position information 130 to identify the depth change of the target object 104. In addition, the depth change ratio 142 can be calculated as a ratio between the previous distance from the robot 102 to the target object 104 when the reference image 202 was taken over the current distance D1. At the beginning of the tracking, the previous distance is the target distance 220. From operation 610, the routine 600 proceeds to operation 612, where it ends.

It should be understood that the horizontal, vertical and depth movement 140 of the target object 104 can be represented in the unit of image pixels, or in the unit of actual distance. The conversion between the pixel distance and the actual distance measurement can be performed based on the parameters of the camera 110, such as the distance between the lenses in the stereo camera 110. It should be further understood that the routines described in FIGS. 5 and 6 can be performed for every two consecutive images, every other images, or any pair of images. Further, it is not necessary for the target object 104 to move between the time period from the reference image 202 was taken and the working image 302 was taken. If the target object 104 did not move between the two images, the depth change ratio 142 would be close to one.

In some implementations, additional operations can be performed to improve the tracking accuracy. For example, after obtaining the depth change ratio 142 and before updating the object image 134 based on the working image 302, the object image 134 can be scaled according to the depth change ratio 142. The 2D matching can be performed again based on the scaled object image 134 to find the best match among the test object images 304 in the working image 302. The test object image 304 that best matches the object image 134 can be used as the updated object image 134 which can be used for next round of tracking. The test object image 304 that best matches the object image 134 can also be used to update the previously calculated horizontal and vertical movement 140 of the target object 104.

Figure 7:
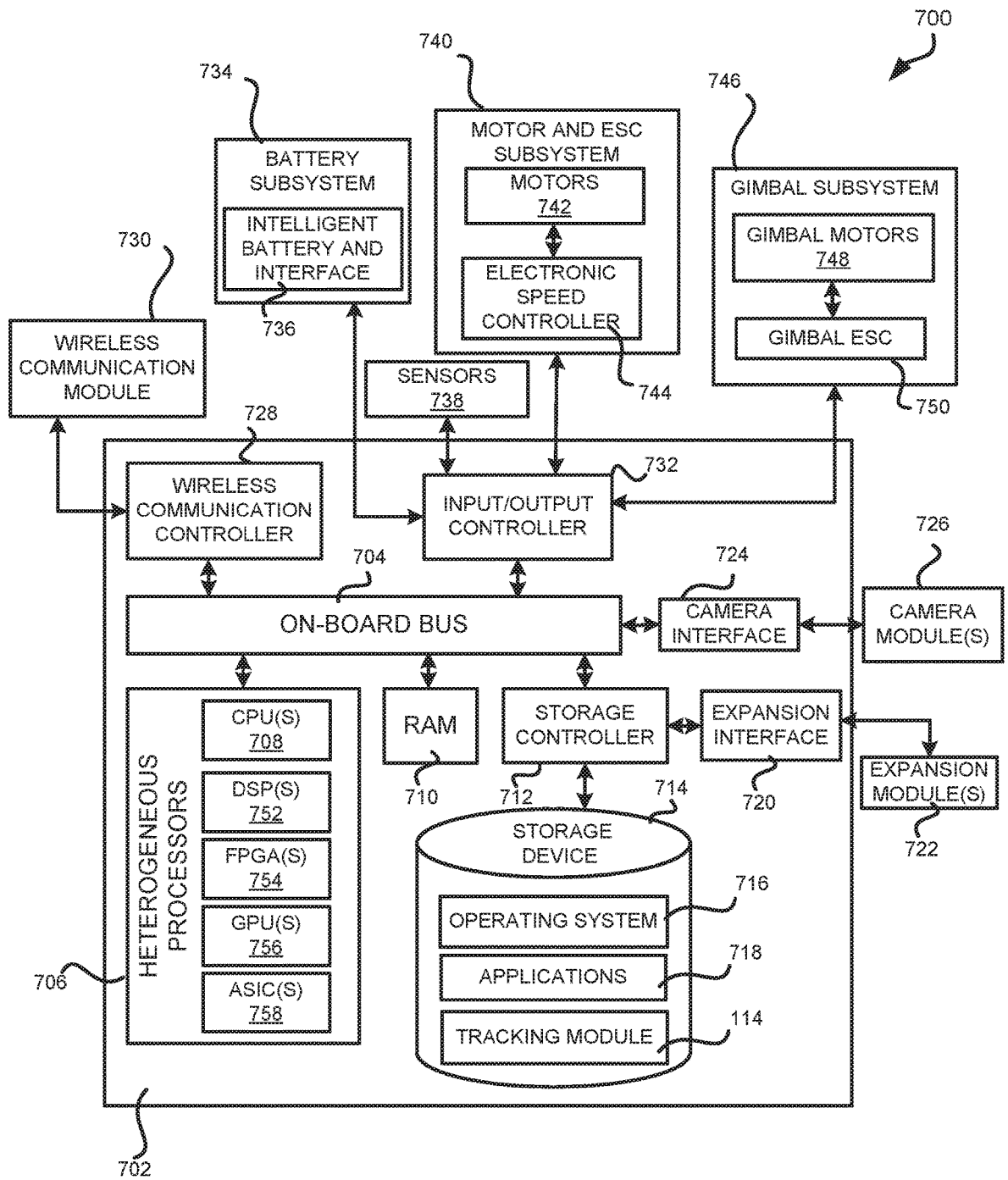
FIG. 7 is an architecture diagram showing an illustrative hardware architecture for implementing a robotic device that can be utilized to implement aspects of the various technologies presented herein.

FIG. 7 shows an example architecture for a computing device 700 capable of executing program components for implementing the functionality described above. The architecture shown in FIG. 7 illustrates a drone, a mobile robot, or any other robot that is capable of moving around, and can be utilized to execute any of the software components presented herein.

The computing device 700 includes on-board compute-and-control module 702 which include an on-board bus 704. The on-board bus 704 is a communication system that transfers data between components inside the computing device 700. In one illustrative configuration, the computing device 700 includes one or more heterogeneous processors 706. The heterogeneous processors 706 can include one or more central processing units ("CPUs") 708 which can be standard programmable processors that perform arithmetic and logical operations necessary for the operation of the computing device 700.

The CPUs 708 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The digital signal processors ("DSPs") 752 is a special-purpose microprocessor, which can be optimized to perform operations related to digital signal processing, typically involving, but not limited to, tasks such as measuring, filtering, compression, and conversion of digitized analog signals. DSPs typically have higher power efficiency compared to general-purpose microprocessors.

The field-programmable gate array ("FPGA") 754 is a customizable and reprogrammable integrated circuit, which can be used to achieve highly efficient special purpose computing with a relatively low design and deployment cost. FPGAs are widely used in the fields of telecommunications, digital signal processing, computer vision, speech processing, deep-learning neural networks, etc.

The graphical processing units ("GPUs") 756 is a highly parallel computing circuit designed for large-scale computing tasks such as video compression, graphic rendering, scientific computing, computer vision, deep-learning neural networks, etc.

The application-specific integrated circuit ("ASICs") 758 is an integrated circuit customized for a specific application. For a targeted application, an ASIC circuit typically exhibits the highest power efficiency and computation speed and usually no extra circuitry is provided to other forms of general-purpose computing, hence its use outside the targeted application are generally not applicable. ASICs can be designed to perform tasks in wireless communications, digital signal processing, computer vision, deep-learning neural networks, etc.

A microcontroller unit ("MCU") 760 is a single integrated circuit with one or more CPU cores, non-volatile memory, RAM, and programmable input/output peripherals all packaged within the same system on chip ("SoC"). Compared to using separate chipsets for microprocessor, memory, and peripheral devices, microcontrollers are designed for embedded applications with low cost and low power constraints. Typical applications using microcontrollers include automobile control, biomedical devices and robotics such as unmanned aerial vehicles.

The on-board bus 704 supports the communications between the heterogeneous processors 706 and the remainder of the components and devices on the on-board bus 704. The on-board bus 704 can support communication with a RAM 710, used as the main memory in the computing device 700. The on-board bus 704 can further support communication with a storage device 714 that provides non-volatile storage for the computing device 700. The storage device 714 can store an operating system 716, software applications 718 such as movement control, vision processing, inertial navigation, and others, and a tracking module 114, which has been described in greater detail herein. The storage device 714 can be connected to the on-board bus 704 through a storage controller 712. The storage device 714 can consist of one or more physical storage units. The storage controller 712 can interface with the physical storage units through a serial attached SCSI ("SAS") interface, a serial advanced technology attachment ("SATA") interface, a fiber channel ("FC") interface, an embedded MultiMediaCard ("EMMC") interface, a Universal Flash Storage ("UFS") interface, or other type of interface for physically connecting and transferring data between computers and physical storage units.

The computing device 700 can store data on the storage device 714 by transforming the physical state of the physical storage units to reflect the information being stored. The specific transformation of physical state can depend on various factors, in different implementations of this description. Examples of such factors can include, but are not limited to, the technology used to implement the physical storage units, whether the storage device 714 is characterized as primary or secondary storage, and the like.

For example, the computing device 700 can store information to the storage device 714 by issuing instructions through the storage controller 712 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the storage device 714 by detecting the physical states or characteristics of one or more particular locations within the physical storage units.

In addition to the storage device 714 described above, the computing device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 714 can store an operating system 716 utilized to control the operation of the computing device 700. According to one configuration, the operating system comprises Linux distributions such as Ubuntu, Gentoo, Debian, OpenWRT, etc., and a large collection of embedded real-time operating system ("RTOS") such as VXWorks and Nuttx. UAV flight control can also be run on a micro-processor without operating system. In this case, the storage device will contain only the essential programs that are needed to run flight control algorithms, and these programs will run directly on a microprocessor such as an MCU. These programs are sometimes also called "bare-metal" programs. The storage device 714 can store other system or application programs and data utilized by the computing device 700.

In one configuration, the storage device 714 or other computer-readable storage media is encoded with computer-executable instructions which, when loaded into the computing device 700, make the computing system into a special-purpose computing device capable of implementing the configurations described herein. These computer-executable instructions transform the computing device 700 by specifying how the CPUs 708 transition between states, as described above. According to one configuration, the computing device 700 has access to computer-readable storage media storing computer-executable instructions which, when executed by the computing device 700, perform the various processes described above with regard to FIGS. 1-6. The computing device 700 can also include computer-readable storage media for performing any of the other computer-implemented operations described herein.

The storage expansion interface 720 can be used to add additional external storage modules in addition to on-board storage. The expansion interface can employ one of multitude of technologies, such as multimedia card ("MMC") interface, secure digital ("SD") interface, secure digital high capacity ("SDHC"), secure digital extended capacity ("SDXC") interface, universal serial bus ("USB") interface, PCI express interface, etc. The expansion storage module is a storage that the compute-and-control module 702 can communicate to via the expansion interface 720. The expansion module can employ one of multitude of technologies, such as flash storage or magnetic storage.

The computing device 700 can operate in a networked environment using logical connections to remote computing devices and computer systems through a network, such as a wireless network. The computing device 700 can include functionality for providing network connectivity through a wireless communication controller 728. The wireless communication controller 728 is capable of connecting the computing device 700 to other computing devices over the wireless network. The wireless communication module can employ one of a multitude of technologies, such as Wi-Fi, ZigBee, Bluetooth, proprietary point-to-point microwave communications, cellular systems such as 3G, 4G, 5G, WiMax and LTE networks, and custom-protocol small-scale wireless networks.

The computing device 700 can also include one or more input/output controllers 732 for receiving and processing input from a number of input devices, such as one or more sensors 738, a battery subsystem 734, or other type of input devices. Such sensors may include but not limited to, inertial measurement units, magnetometer, barometer, sonar, LiDar, ToF camera. The battery subsystem may include a battery and associated circuitry to provide information about the level of charge and general condition of the battery, and such information can be communicated to the computing device via a peripheral communication interface such as universal asynchronous receiver/transmitter ("UART"), inter-integrated circuit ("I²C"), and serial peripheral interface ("SPI") protocols.

Similarly, an input/output controller 732 can provide outputs to output devices or systems such as a motor and ESC subsystem 740 and a gimbal subsystem 746. The motor subsystem may include one or more electronic speed controllers ("ESCs"), and/or one or more electric motors. The ESC is a special circuit to convert control signals into electric signals that causes the motor to operate at a desired speed. The electric motor then produces output energy in the form of rotation thrust and torque, and causes the robot to mobilize. The gimbal subsystem is a special electronic module that can be used to stabilize a camera or other objects. A gimbal typically include one or more electric motors, a sensor for sensing the movement of the camera, a computing circuit that can calculate the attitude of the camera, and one or more ESCs that drives the electric motors and causes the camera to point to a desired direction in spite of the movement by the device or vehicle that holds the gimbal. It will be appreciated that the computing device 700 might not include all of the components shown in FIG. 7, can include other components that are not explicitly shown in FIG. 7, or might utilize an architecture completely different than that shown in FIG. 7.

The disclosure presented herein can be considered to encompass the subject matter set forth in the following clauses.

Clause 1: A computer implemented method for tracking an object, the method comprising: capturing, by a robot, a first image showing a target object; obtaining object data of the target object, the object data comprising an object image and a target distance between the target object and the robot, the object image comprising a portion of the first image contained in a first bounding box showing at least a portion of the target object; capturing, by the robot, a second image showing the target object; determining a current distance between the target object and the robot at a time when the second image is being taken; calculating a depth change ratio based on the target distance and the current distance; generating a second bounding box by scaling, according to the depth change ratio, a search window having a same size as the first bounding box; updating the object data by applying the second bounding box to the second image and extracting a portion of the second image that is contained in the second bounding box as an updated object image; and causing the robot to move according to the determined current distance and the target distance.

Clause 2: The computer-implemented method of clause 1, wherein the robot comprises a stereo camera, and wherein the first image and the second image are taken by the stereo camera.

Clause 3: The computer-implemented method of clauses 1-2, wherein the target distance and the current distance between the target object and the robot is determined based on images taken by the stereo camera.

Clause 4: The computer-implemented method of clauses 1-3, further comprising determining an amount of a horizontal movement and an amount of a vertical movement of the target object from a time point when the first image is taken to a time point when the second image is taken, wherein position of the second bounding box on the second image reflects the amount of the horizontal movement and the amount of the vertical movement of the target object.

Clause 5: The computer-implemented method of clauses 1-4, wherein the robot is further caused to move according to the horizontal movement and the vertical movement of the target object.

Clause 6: The computer-implemented method of clauses 1-5, wherein the object data further comprises a feature template generated based on the object image, and wherein the amount of the horizontal movement and the amount of the vertical movement of the target object are determined based at least in part upon the feature template and the second image.

Clause 7: An apparatus comprising: at least one processor; at least one camera; at least one motor configured to move the apparatus from one location to another location; and a computer-readable storage medium having computer-executable instructions stored thereupon that, when executed by the at least one processor, cause the at least one processor to at least: obtain object data of a target object, the object data comprising an object image showing at least a portion of the target object and a target distance between the target object and the apparatus; cause the camera to capture an image showing the target object; determine a current distance between the target object and the apparatus at a time point when the image is taken; identify the target object in the image; calculate a depth change ratio based on the target distance and the current distance; scale a bounding box having a size of the object image according to the depth change ratio; update the object data by applying the bounding box to the image and extracting a portion of the image that is contained in the bounding box as an updated object image; and cause the motor to move the apparatus to a new location based on, at least in part, the determined current distance and the target distance.

Clause 8: The apparatus of clause 7, wherein the computer-readable storage medium has further computer-executable instructions that comprise determining an amount of a horizontal movement and an amount of a vertical movement of the target object from a time point when the object image is taken to a time point when the image is taken, wherein a position of the bounding box on the image reflects the amount of the horizontal movement and the amount of the vertical movement of the target object.

Clause 9: The apparatus of clauses 7-8, wherein moving the apparatus to the new location is further based on the horizontal movement and the vertical movement of the target object.

Clause 10: The apparatus of clauses 7-9, wherein the object data further comprises a feature template generated based on the object image, and wherein the amount of the horizontal movement and the amount of the vertical movement of the target object are determined based at least in part upon the feature template and the image.

Clause 11: The apparatus of clauses 7-10, wherein the object feature template is calculated using histogram of oriented gradients.

Clause 12: The apparatus of clauses 7-11, wherein the object feature template is calculated using kernelized correlation filters.

Clause 13: The apparatus of clauses 7-12, wherein updating the object data further comprises updating the object feature template based on the updated object image.

Clause 14: A non-transitory computer-readable storage medium having computer-executable instructions stored thereupon which, when executed by a processor, cause the processor to: access object data of a target object, the object data comprising an object image showing at least a portion of the target object and a target distance between the target object and a robot; access an image showing the target object; determine a current distance between the target object and the robot at a time point when the image is taken; calculate a depth change ratio based on the target distance and the current distance; scale a bounding box that has a size of the object image according to the depth change ratio; update the object data by extracting a portion of the image having a size of the bounding box as an updated object image; and cause the robot to move to a new location based on, at least in part, the determined current distance and the target distance.

Clause 15: The non-transitory computer-readable storage medium of clause 14, having further computer-executable instructions that comprise determining an amount of a horizontal movement and an amount of a vertical movement of the target object from a time point when the object image is taken to a time point when the image is taken, wherein a position of the bounding box on the image reflects the amount of the horizontal movement and the amount of the vertical movement of the target object.

Clause 16: The non-transitory computer-readable storage medium of clauses 14-15, wherein the robot is further caused to move according to the horizontal movement and the vertical movement of the target object.

Clause 17: The non-transitory computer-readable storage medium of clauses 14-16, wherein the object image is extracted from a reference image that is taken before the image is taken.

Clause 18: The non-transitory computer-readable storage medium of clauses 14-17, wherein the object image is extracted from the reference image using deformable parts model or Convolutional Neural Network.

Clause 19: The non-transitory computer-readable storage medium of clauses 14-18, wherein the current distance between the target object and the robot is determined as a function of distances of a plurality of depth sample points on the target object to the robot.

Clause 20: The non-transitory computer-readable storage medium of clauses 14-19, wherein the target object is a moving object.

Based on the foregoing, it should be appreciated that technologies for tracking objects based on depth information have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer implemented method for tracking an object, the method comprising:

capturing, by a robot, a first image showing a target object;
obtaining object data of the target object, the object data comprising an object image and a target distance between the target object and the robot, the object image comprising a portion of the first image contained in a first bounding box showing at least a portion of the target object;
capturing, by the robot, a second image showing the target object;
determining a current distance between the target object and the robot at a time when the second image is being taken;
calculating a depth change ratio based on the target distance and the current distance;
generating a second bounding box by scaling, according to the depth change ratio, a search window having a same size as the first bounding box;
updating the object data by applying the second bounding box to the second image and extracting a portion of the second image that is contained in the second bounding box as an updated object image; and
causing the robot to move according to the determined current distance and the target distance.

2. The computer-implemented method of claim 1, wherein the robot comprises a stereo camera, and wherein the first image and the second image are taken by the stereo camera.

3. The computer-implemented method of claim 2, wherein the target distance and the current distance between the target object and the robot is determined based on images taken by the stereo camera.

4. The computer-implemented method of claim 1, further comprising determining an amount of a horizontal movement and an amount of a vertical movement of the target object from a time point when the first image is taken to a time point when the second image is taken, wherein position of the second bounding box on the second image reflects the amount of the horizontal movement and the amount of the vertical movement of the target object.

5. The computer-implemented method of claim 4, wherein the robot is further caused to move according to the horizontal movement and the vertical movement of the target object.

6. The computer-implemented method of claim 4, wherein the object data further comprises a feature template generated based on the object image, and wherein the amount of the horizontal movement and the amount of the vertical movement of the target object are determined based at least in part upon the feature template and the second image.

7. An apparatus comprising:
at least one processor;
at least one camera;
at least one motor configured to move the apparatus from one location to another location; and
a computer-readable storage medium having computer-executable instructions stored thereupon that, when executed by the at least one processor, cause the at least one processor to at least:
 obtain object data of a target object, the object data comprising an object image showing at least a portion of the target object and a target distance between the target object and the apparatus;
 cause the camera to capture an image showing the target object;
 determine a current distance between the target object and the apparatus at a time point when the image is taken;
 identify the target object in the image;
 calculate a depth change ratio based on the target distance and the current distance;
 scale a bounding box having a size of the object image according to the depth change ratio;
 update the object data by applying the bounding box to the image and extracting a portion of the image that is contained in the bounding box as an updated object image; and
 cause the motor to move the apparatus to a new location based on, at least in part, the determined current distance and the target distance.

8. The apparatus of claim 7, wherein the computer-readable storage medium has further computer-executable instructions that comprise determining an amount of a horizontal movement and an amount of a vertical movement of the target object from a time point when the object image is taken to a time point when the image is taken, wherein a position of the bounding box on the image reflects the amount of the horizontal movement and the amount of the vertical movement of the target object.

9. The apparatus of claim 8, wherein moving the apparatus to the new location is further based on the horizontal movement and the vertical movement of the target object.

10. The apparatus of claim 8, wherein the object data further comprises a feature template generated based on the object image, and wherein the amount of the horizontal movement and the amount of the vertical movement of the target object are determined based at least in part upon the feature template and the image.

11. The apparatus of claim 10, wherein the object feature template is calculated using histogram of oriented gradients.

12. The apparatus of claim 10, wherein the object feature template is calculated using kernelized correlation filters.

13. The apparatus of claim 10, wherein updating the object data further comprises updating the object feature template based on the updated object image.

14. A non-transitory computer-readable storage medium having computer-executable instructions stored thereupon which, when executed by a processor, cause the processor to:
access object data of a target object, the object data comprising an object image showing at least a portion of the target object and a target distance between the target object and a robot;
access an image showing the target object;
determine a current distance between the target object and the robot at a time point when the image is taken;
calculate a depth change ratio based on the target distance and the current distance;
scale a bounding box that has a size of the object image according to the depth change ratio;
update the object data by extracting a portion of the image having a size of the bounding box as an updated object image; and
cause the robot to move to a new location based on, at least in part, the determined current distance and the target distance.

15. The non-transitory computer-readable storage medium of claim 14, having further computer-executable instructions that comprise determining an amount of a horizontal movement and an amount of a vertical movement of the target object from a time point when the object image is taken to a time point when the image is taken, wherein a position of the bounding box on the image reflects the amount of the horizontal movement and the amount of the vertical movement of the target object.

16. The non-transitory computer-readable storage medium of claim 15, wherein the robot is further caused to move according to the horizontal movement and the vertical movement of the target object.

17. The non-transitory computer-readable storage medium of claim 14, wherein the object image is extracted from a reference image that is taken before the image is taken.

18. The non-transitory computer-readable storage medium of claim 17, wherein the object image is extracted from the reference image using deformable parts model or Convolutional Neural Network.

19. The non-transitory computer-readable storage medium of claim 14, wherein the current distance between the target object and the robot is determined as a function of distances of a plurality of depth sample points on the target object to the robot.

20. The non-transitory computer-readable storage medium of claim 14, wherein the target object is a moving object.

\* \* \* \* \*